US010577840B2

(12) United States Patent
Rrumbullaku et al.

(10) Patent No.: US 10,577,840 B2
(45) Date of Patent: Mar. 3, 2020

(54) SYSTEM AND METHOD FOR DETECTING UNLATCHED CONDITION OF CLOSURE

(71) Applicant: GM GLOBAL TECHNOLOGY OPERATIONS LLC, Detroit, MI (US)

(72) Inventors: Besi Rrumbullaku, Rochester, MI (US); Jeffrey R. Nowicki, Harrison Township, MI (US); Alexandre F. Volpato, Rochester Hills, MI (US); Thiago Laserra Lima, Sterling Heights, MI (US); James C. O'Kane, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 15/656,022

(22) Filed: Jul. 21, 2017

(65) Prior Publication Data

US 2019/0024419 A1 Jan. 24, 2019

(51) Int. Cl.

*B62D 25/00* (2006.01)
*E05B 81/20* (2014.01)

(Continued)

(52) U.S. Cl.

CPC .............. *E05B 81/20* (2013.01); *E05B 77/54* (2013.01); *E05B 81/66* (2013.01); *E05B 81/70* (2013.01); *E05F 15/00* (2013.01); *E05F 15/611* (2015.01); *E05B 83/18* (2013.01); *E05B 83/36* (2013.01); *E05C 3/00* (2013.01); *E05Y 2201/22* (2013.01); *E05Y 2400/336* (2013.01); *E05Y 2400/44* (2013.01); *E05Y 2400/45* (2013.01); *E05Y 2400/50* (2013.01); *E05Y 2400/502* (2013.01);

(Continued)

(58) Field of Classification Search

CPC .......... E06B 81/20; E06B 81/66; E06B 81/70; E06B 77/54; E05F 15/00; E05F 15/611; E05B 83/18; E05B 83/36; E05C 3/00; E05Y 2400/44; E05Y 2400/45; E05Y 2400/50; E05Y 2400/66; E05Y 2900/531; E05Y 2900/532; E05Y 2900/546; E05Y 2201/22

USPC ........................................................... 296/56

See application file for complete search history.

(56) References Cited

U.S. PATENT DOCUMENTS 4,674,230 A * 6/1987 Takeo .................. E05C 17/003
49/28
7,068,146 B2 * 6/2006 Sasaki ..................... E05B 77/48
307/10.1

(Continued)

*Primary Examiner* — Jerry E Redman

(57) ABSTRACT

An automotive vehicle includes a closure arranged relative a closure frame to selectively cover an opening to the vehicle. The vehicle also includes an actuator configured to move the closure among a plurality of positions including open and closed positions, and a first sensor configured to detect motion of the closure among the plurality of positions. The vehicle additionally includes a latch assembly with an engaged state to retain the closure in the closed position and a disengaged state to permit the closure to move among the plurality of positions. A second sensor is configured to detect the engaged or disengaged state of the latch assembly. The vehicle further includes a controller which is configured to, in response to the first sensor detecting motion of the closure among the plurality of positions and the second sensor detecting the latch assembly in the engaged state, provide a diagnostic signal.

8 Claims, 4 Drawing Sheets

(51) Int. Cl.

| | |
|---|---|
| ***E05F 15/611*** | (2015.01) |
| ***E05B 77/54*** | (2014.01) |
| ***E05B 81/66*** | (2014.01) |
| ***E05B 81/70*** | (2014.01) |
| ***E05F 15/00*** | (2015.01) |
| *E05B 83/18* | (2014.01) |
| *E05B 83/36* | (2014.01) |
| *E05C 3/00* | (2006.01) |

(52) U.S. Cl.

CPC ....... *E05Y 2400/66* (2013.01); *E05Y 2800/12* (2013.01); *E05Y 2900/531* (2013.01); *E05Y 2900/532* (2013.01); *E05Y 2900/546* (2013.01)

(56) References Cited

U.S. PATENT DOCUMENTS

| | | | | |
|---|---|---|---|---|
| 2002/0039008 | A1* | 4/2002 | Edgar | H02H 7/0851 318/445 |
| 2009/0249699 | A1* | 10/2009 | Yulkowski | E05F 15/00 49/349 |
| 2012/0285087 | A1* | 11/2012 | Eggeling | E05B 81/14 49/29 |
| 2013/0099524 | A1* | 4/2013 | Brown | B60J 5/0473 296/146.9 |
| 2016/0024831 | A1* | 1/2016 | Houser | E05F 15/611 49/29 |
| 2016/0083995 | A1* | 3/2016 | Dezorzi | E05F 15/73 340/5.72 |
| 2017/0030118 | A1* | 2/2017 | Elie | B60Q 9/00 |
| 2017/0030126 | A1* | 2/2017 | Elie | E05F 15/614 |
| 2017/0030127 | A1* | 2/2017 | Elie | E05F 15/42 |
| 2017/0030128 | A1* | 2/2017 | Elie | E05F 15/42 |
| 2017/0030133 | A1* | 2/2017 | Elie | E05F 15/70 |
| 2017/0030135 | A1* | 2/2017 | Elie | E05F 15/41 |
| 2017/0032599 | A1* | 2/2017 | Elie | G06F 3/005 |
| 2017/0130495 | A1* | 5/2017 | Wheeler | B60J 5/0473 |
| 2017/0247926 | A1* | 8/2017 | Elie | E05F 15/40 |
| 2017/0247927 | A1* | 8/2017 | Elie | E05F 15/60 |
| 2017/0247933 | A1* | 8/2017 | Elie | E05F 15/40 |
| 2018/0038147 | A1* | 2/2018 | Linden | E05F 15/616 |
| 2018/0135345 | A1* | 5/2018 | Limke | E05F 15/70 |
| 2018/0252004 | A1* | 9/2018 | Bishop | E05B 81/20 |
| 2018/0266160 | A1* | 9/2018 | Bito | E05F 15/40 |
| 2018/0347240 | A1* | 12/2018 | Jeong, II | E05B 79/20 |
| 2019/0024419 | A1* | 1/2019 | Rrumbullaku | E05F 15/611 |
| 2019/0063117 | A1* | 2/2019 | Mozola | E05B 81/22 |
| 2019/0169886 | A1* | 6/2019 | Rosales | E05B 81/20 |
| 2019/0169887 | A1* | 6/2019 | Rosales | E05F 15/60 |
| 2019/0218820 | A1* | 7/2019 | Westgarth | B60J 5/06 |
| 2019/0249467 | A1* | 8/2019 | Patane | E05B 79/20 |
| 2019/0271179 | A1* | 9/2019 | Patane | E05B 81/16 |
| 2019/0271180 | A1* | 9/2019 | Sardelli | E05B 77/02 |
| 2019/0284849 | A1* | 9/2019 | Ilea | E05B 81/54 |

* cited by examiner

SYSTEM AND METHOD FOR DETECTING UNLATCHED CONDITION OF CLOSURE

TECHNICAL FIELD

The present disclosure relates to automotive vehicles, and more particularly to automatic closure systems for automotive vehicles.

INTRODUCTION

Vehicles are generally provided with closures to allow for entry and exit to the vehicle, while also protecting vehicle contents during a drive cycle. Closures are generally mounted on the body and pivotable between open and closed positions. Example closures include driver doors, passenger doors, and rear lift gates. The size, geometry, and location of a given closure may vary based on the vehicle platform and purpose of the closure.

SUMMARY

An automotive vehicle according to the present disclosure includes a closure frame defining an opening to the vehicle, and a closure arranged relative the closure frame to selectively cover the opening. The closure has a plurality of positions including a closed position and an open position. The vehicle also includes an actuator configured to move the closure among the plurality of positions, and a first sensor configured to detect motion of the closure among the plurality of positions. The vehicle additionally includes a latch assembly. The latch assembly includes a first component associated with the closure and a second component associated with the closure frame. The first component and second component are couplable in an engaged state to retain the closure in the closed position and decouplable in a disengaged state to permit the closure to move among the plurality of positions. A second sensor is configured to detect the engaged or disengaged state of the latch assembly. The vehicle further includes a controller. The controller is configured to, in response to the first sensor detecting motion of the closure among the plurality of positions and the second sensor detecting the latch assembly in the engaged state, provide a diagnostic signal.

In an exemplary embodiment, the latch assembly includes a primary latch and a secondary latch, and the second sensor includes a first switch associated with the primary latch and a second switch associated with the secondary latch.

In an exemplary embodiment, the first sensor includes a Hall effect encoder associated with the actuator.

In an exemplary embodiment, the controller is further configured to, in response to the first sensor detecting motion of the closure among the plurality of positions and the second sensor detecting the latch assembly in the engaged state, command the actuator to move the closure a predefined distance toward the open position. The controller is also configured to detect an actuator stall condition, and to provide the diagnostic signal in further response to detecting the actuator stall condition.

In an exemplary embodiment, the vehicle additionally includes a latch actuator configured to selectively decouple the latch assembly. In such an embodiment, the controller is further configured to, in response to the first sensor detecting motion of the closure among the plurality of positions and the second sensor detecting the latch assembly in the engaged state, command the latch actuator to decouple the latch assembly. The controller is also configured to command the actuator to move the closure a predefined distance toward the closed position, and to provide the diagnostic signal in further response to the first sensor detecting motion of the closure among the plurality of positions and the second sensor detecting the latch assembly in the engaged state subsequent the command to the actuator to move the closure a predefined distance.

In an exemplary embodiment, the vehicle additionally includes a human-machine interface. In such an embodiment, the diagnostic signal includes an audio notification, visual notification, or haptic notification via the human-machine interface.

In an exemplary embodiment, the vehicle additionally includes a wireless communication interface, wherein the diagnostic signal includes an alert to a remote operator via the wireless communication interface.

A method of controlling a vehicle according to the present disclosure includes providing a vehicle with a first sensor configured to detect motion of a closure, a second sensor configured to detect an engaged or disengaged state of a latch assembly, and a controller in communication with the first sensor, second sensor, and actuator, the controller being programmed with a latch diagnostic protocol. The method also includes receiving, via the first sensor, a first signal indicating motion of the closure. The method additionally includes receiving, via the second sensor, a second signal indicating the latch assembly being engaged. The method further includes, in response to the first signal indicating motion exceeding a threshold and the second signal indicating the latch assembly being engaged, automatically operating the controller according to the latch diagnostic protocol.

In an exemplary embodiment, providing a vehicle with a first sensor includes providing the vehicle with an actuator configured to control motion of the closure and a Hall effect encoder associated with the actuator.

In an exemplary embodiment, providing a vehicle with a first sensor includes providing the vehicle with an actuator configured to control motion of the closure. In such an embodiment, the diagnostic protocol includes commanding the actuator, via the controller, to move the closure a predefined distance toward the open position, detecting an actuator stall condition, and providing a diagnostic signal in response to detecting the actuator stall condition.

In an exemplary embodiment, the method additionally includes providing a latch actuator configured to selectively decouple the latch assembly. In such an embodiment, providing a vehicle with a first sensor includes providing the vehicle with an actuator configured to control motion of the closure. In addition, the diagnostic protocol includes commanding the latch actuator to decouple the latch assembly, commanding the actuator to move the closure a predefined distance toward the closed position, and providing a diagnostic signal in response to the first sensor detecting motion of the closure among the plurality of positions and the second sensor detecting the latch assembly in the engaged state subsequent the command to the actuator to move the closure a predefined distance.

In an exemplary embodiment, the method additionally includes providing a human-machine interface. In such an embodiment, the diagnostic protocol includes providing an audio notification, visual notification, or haptic notification via the human-machine interface.

In an exemplary embodiment, the method additionally includes providing a wireless communication interface. In such an embodiment, the diagnostic protocol includes providing an alert to a remote operator via the wireless communication interface.

Embodiments according to the present disclosure provide a number of advantages. For example, the present disclosure provides a system and method for automatically detecting when a closure is not correctly latched and for performing appropriate diagnostic actions when such conditions arise, thereby improving user satisfaction.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
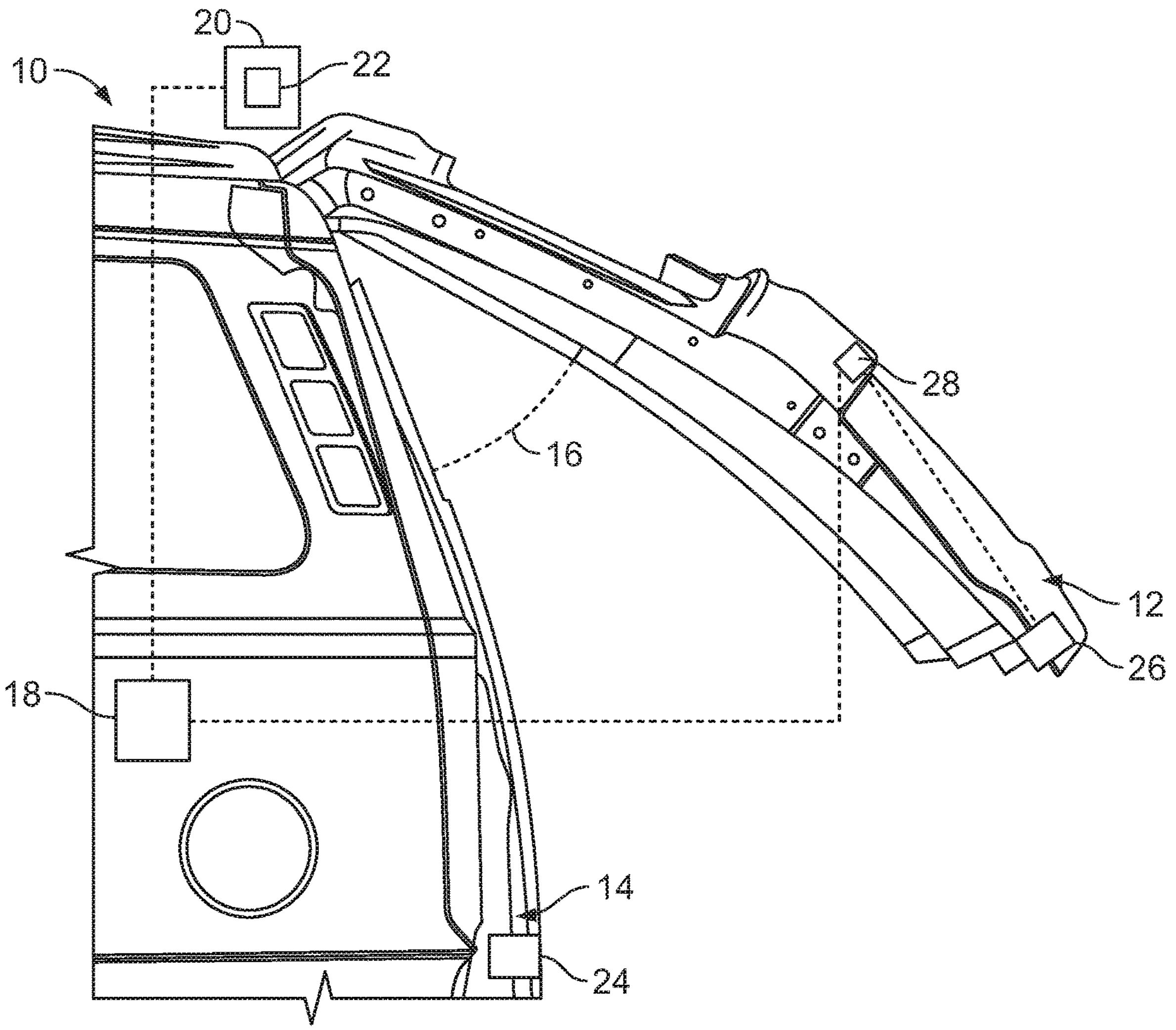
FIG. 1 illustrates a first embodiment of an automotive vehicle according to the present disclosure.

Referring now to FIG. 1, a partial, schematic side-view of a vehicle 10 according to the present disclosure is illustrated. The vehicle 10 includes a closure 12 pivotably coupled to a closure frame 14. The closure 12 is illustrated in a partially open position in FIG. 1, having an opening angle 16 defined by the position of the closure 12 relative to the closure frame 14. In this embodiment, the closure 12 is a vertically-opening lift gate for an SUV or van. However, other embodiments may include horizontally-opening closures such as a vehicle driver door or passenger door, or other vertically-opening closures such as a gull-wing door.

Although not shown in detail, the closure 12 is pivotably mounted on the closure frame 14, e.g. with a hinge. The closure 12 may include a shell defined by inner and outer panels that enclose various components of the closure 12 and may further include one or more windows and window frames.

Generally, the closure frame 14 refers to a portion of the vehicle body that defines an opening and cooperates or mates with the closure 12 to selectively provide access or seal that opening. In the depicted exemplary embodiment, the closure frame 14 corresponds to a D-pillar, although in other embodiments, the closure frame 14 may refer to other portions of the body.

In addition, the closure 12 includes a latching mechanism to secure the closure 12 in a closed position, to initiate opening, or both. The latching mechanism includes a first portion 24 and a second portion 26. The first portion 24 and second portion 26 are selectively engageable with one another. The first portion 24 and second portion 26 may be engaged to restrain the closure 12 in a closed position or released to permit the closure 12 to open. The first portion 24 is coupled to the frame 14, and the second portion 26 is coupled to the closure 12. In an exemplary embodiment, the first portion 24 includes a striker bar and the second portion 26 includes a pivotable forkbolt which may selectively engage with the striker bar. In such embodiments, the second portion 26 may include a two-stage latch mechanism, e.g. distinct primary and secondary detents to maintain the forkbolt engaged with the striker bar. However, in other embodiments, various other known latching mechanisms may be used.

At least one latch sensor 28 is associated with the latch mechanism. The latch sensor 28 is configured to generate a signal indicative of a latched and/or unlatched state of the latch mechanism. In the illustrative embodiment of FIG. 1 the latch sensor 28 is associated with the second portion 26; however, in other embodiments the latch sensor 28 may be associated with the first portion 24. In embodiments having a two-stage latch mechanism as discussed above, the at least one latch sensor 28 may include a first sensor associated the primary latch mechanism and a second sensor associated with the secondary latch mechanism. In such embodiments, the at least one latch sensor 28 may be configured to provide distinct first and second signals indicative of the states of the primary and secondary latch mechanisms, respectively. In an exemplary embodiment, the at least one latch sensor 28 includes at least one switch arranged to be depressed when the closure 12 is closed and to, in response to being depressed, generate a signal indicating a latched state. However, various other known types of sensors may be used in other embodiments.

The vehicle 10 additionally includes at least one controller 18, an actuation unit 20, and at least one actuation unit sensor 22. The controller 18, actuation unit 20, actuation unit sensor 22, and latch sensor 28 may be operatively coupled together in any suitable manner, including in a wired or wireless configuration. In one exemplary embodiment, the controller 18, actuation unit 20, actuation unit sensor 22, and latch sensor 28 may communicate with an appropriate short range wireless data communication scheme, such as IEEE Specification 802.11 (Wi-Fi), WiMAX, the BLUETOOTH™ short range wireless communication protocol, a Dedicated Short Range Communication (DSRC) system, or the like, including cellular communications. Although not shown, the controller 18, actuation unit 20, actuation unit sensor 22, and latch sensor 28 may be coupled to a power source, such as a vehicle battery, and may be incorporated into or otherwise cooperate with other vehicle systems.

The controller 18 is generally configured to carry out the functions described below, including controlling operation of the actuation unit 20. As such, the controller 18 generally represents the hardware, software, and/or firmware components configured to facilitate operation. In one exemplary embodiment, the controller 18 may be an electronic control unit (ECU) of the vehicle. Depending on the embodiment, the controller 18 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof. While depicted as a single unit, the controller 18 may be embodied in multiple discrete processing units collectively referred to as the controller 18. In practice, the controller 18 includes processing logic stored in memory that may be configured to carry out the functions, techniques, and processing tasks associated with the operation of the vehicle 10.

In some embodiments, the controller 18 may be associated with a user interface that enables a user to interact with the vehicle 10. Any suitable user interface may be provided, including a touch screen and/or combination of buttons and switches. In one exemplary embodiment, the user interface enables the user to disable or enable functions of the controller 18 or set parameters for the operations of the controller 18. In other embodiments, the ability to make such selections may be omitted, e.g., to prevent a user from inadvertently disabling functions of the controller 18.

The actuation unit 20 is configured to actuate the opening and closing of the closure. As such, the actuation unit 20 may include a motor that selectively assists or drives the closing or opening of the closure based on commands from the controller 18. To control movement of the closure, the actuation unit 20 may include any suitable coupling components, including fluid, magnetic, friction, and/or electric devices. In some embodiments, the actuation unit 20 may be associated with a user interface, such as a door handle, button, or a key fob remote, that enables the user to command the opening and closing of the closure via the controller 18.

The actuation unit 20 is provided with a position sensor 22 to detect or determine position information regarding the closure 12, including the opening angle 16, and provide this position information to the controller 18. In an exemplary embodiment, the position sensor 22 includes a Hall effect encoder. However, in other embodiments within the scope of the present disclosure, other types of sensors such as potentiometers may be used.

Figure 2:
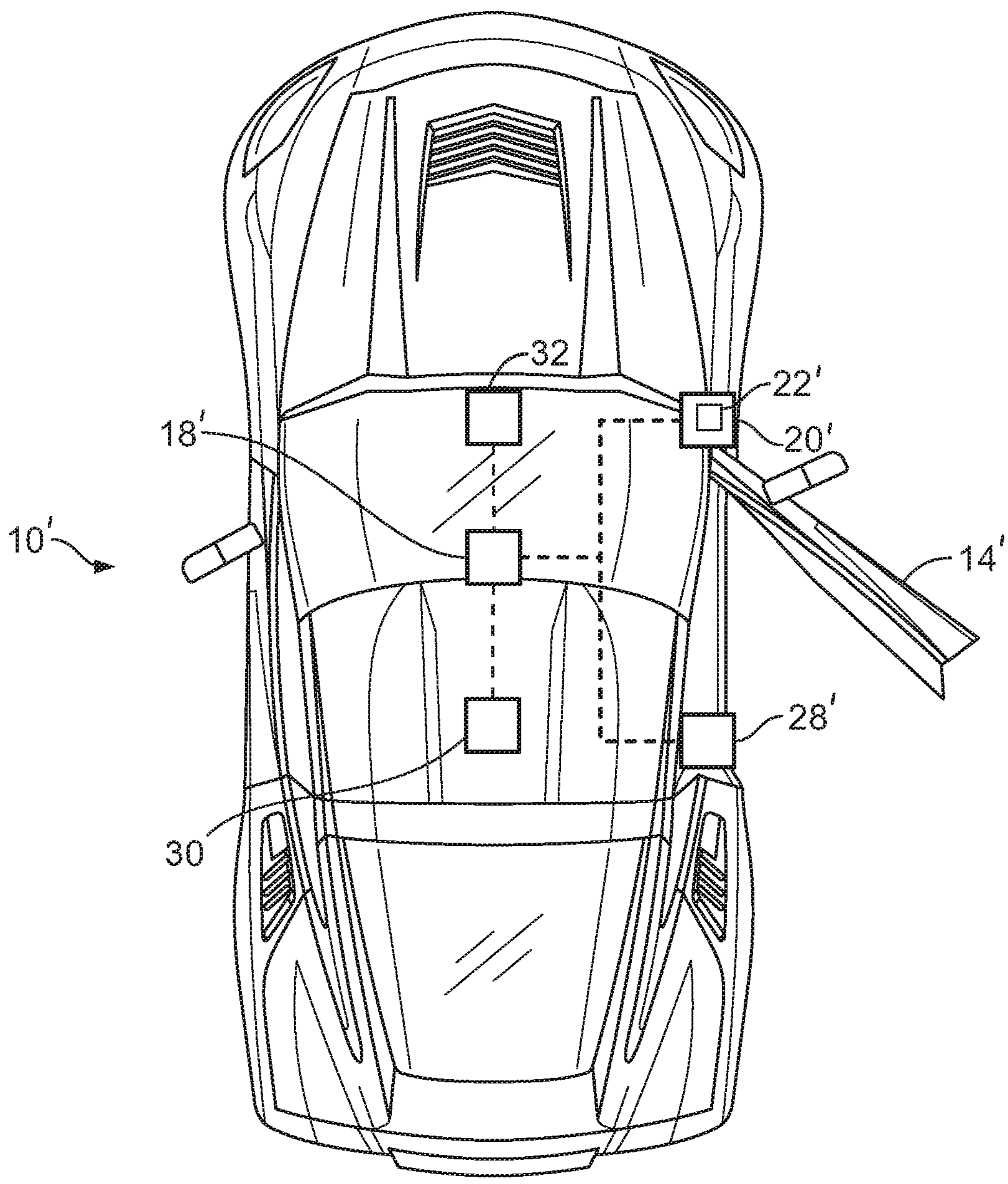
FIG. 2 illustrates a second embodiment of an automotive vehicle according to the present disclosure.

While FIG. 1 illustrates a power liftgate at an aft portion of a vehicle, other embodiments may include other types of closures in other locations on a vehicle. As illustrated in FIG. 2, a vehicle 10' may be provided with a side door 14', an actuation unit 20' arranged to control opening and/or closing of the side door 14' and having an associated position sensor, a latch sensor 28' configured to detect an open or closed position of the side door 14', and a controller 18' in communication with the actuation unit 20' and latch sensor 28'. The controller 18', actuation unit 20', and latch sensor 28' may be arranged and controlled in a generally similar fashion to the controller 18, actuation unit 20, and latch sensor 28 of FIG. 1.

In addition, the vehicle 10' includes a wireless communications system 30 configured to wirelessly communicate with other vehicles ("V2V") and/or infrastructure ("V2I"). In an exemplary embodiment, the wireless communication system 30 is configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11 and cellular data communication, are also considered within the scope of the present disclosure. The wireless communications system 30 is in communication with or under the control of the controller 18.

The vehicle 10' additionally includes a human-machine interface (HMI) 32 in communication with or under the control of the controller 18. The HMI 32 is configured to provide an occupant of the vehicle 10' a means to receive information from and impart information to the controller 18. The HMI 32 may include a touchscreen video display, knobs, buttons, an audio interface, a haptic feedback device, other interfaces, or combination thereof.

While not specifically illustrated in FIG. 1, the vehicle 10 may likewise include a wireless communications system and HMI as illustrated in FIG. 2.

Under some circumstances, a latch sensor may inaccurately report that a latching mechanism is engaged, for example due to debris becoming lodged in the latching mechanism. In such circumstances, it is desirable to have a system to verify that the closure is latched. This may be particularly helpful when implemented in autonomous vehicles, as an automated driving system (ADS) may not otherwise recognize when a closure is not fully latched.

Figure 3:
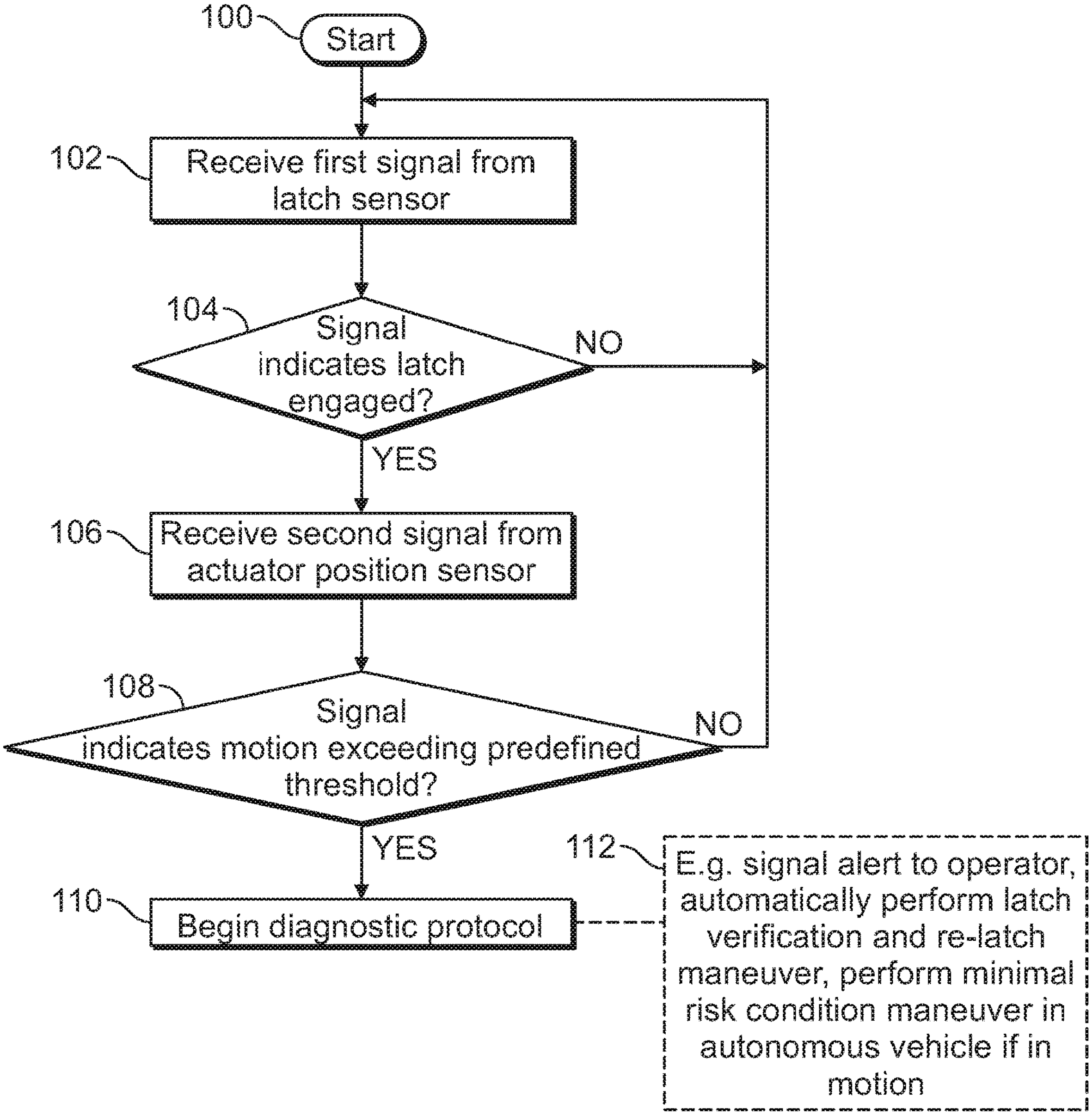
FIG. 3 is a flowchart illustrating a first method for controlling a vehicle according to the present disclosure.

Referring now to FIG. 3, a method of controlling a vehicle according to the present disclosure is illustrated in flowchart form. The algorithm begins at block 100. In an exemplary embodiment, the algorithm is executed subsequent a vehicle start, prior to or concurrent with a vehicle transmission being shifted out of PARK. In another embodiment, the algorithm is executed at regular intervals during a drive cycle when the vehicle is in motion. In other embodiments, the algorithm may be executed at other times or in response to various other inputs, as will be understood by one skilled in the art.

A first signal is received from a latch sensor, as illustrated at block 102. As discussed above with respect to the latch sensor 28 illustrated in FIG. 1, the latch sensor is associated with a latch mechanism and is configured to generate a signal indicative of a latched and/or unlatched state of the latch mechanism. In embodiments used in conjunction with a two-stage latching mechanism, the signal may include distinct primary and secondary signals indicative of the states of the primary and secondary latch mechanisms, respectively. In an exemplary embodiment, the first signal is received by a controller configured as the controller 18 illustrated in FIG. 1.

A determination is made of whether the first signal indicates that the latching mechanism is engaged, as illustrated at operation 104. In an exemplary embodiment, this determination is performed by a controller, e.g. configured as the controller 18 illustrated in FIG. 1. In embodiments used in conjunction with a two-stage latching mechanism, this determination may be satisfied when the first signal or signals indicate that both the primary and secondary latches mechanisms are engaged.

If the determination of operation 104 is negative, i.e. the first signal indicates that the latch is not engaged, then control returns to block 102. The algorithm therefore does not proceed unless and until the first signal indicates that the latch is engaged.

If the determination of operation 104 is positive, i.e. the first signal indicates that the latch is engaged, then control proceeds to block 106.

A second signal is received from an actuator position sensor, as illustrated at block 106. As discussed above with respect to the position sensor 22 illustrated in FIG. 1, the position sensor is associated with an actuation unit and configured to detect or determine position information regarding a closure. In an exemplary embodiment, the second signal is received by a controller, e.g. configured as the controller 18 illustrated in FIG. 1.

A determination is made of whether the second signal indicates closure motion exceeding a predefined threshold, as illustrated at operation 108. In an exemplary embodiment, the predefined threshold corresponds to approximately 6 mm of closure movement. This exemplary threshold is based on typical range of closure motion between primary and secondary latch mechanisms. However, in other embodiments, other thresholds may be used as appropriate.

If the determination of operation 108 is negative, i.e. detected motion, if any, does not exceed the predefined threshold, then control returns to block 102. The algorithm therefore does not take any action unless and until motion exceeding the predefined threshold is detected.

If the determination of operation 108 is positive, i.e. the signal does indicate closure motion exceeding the predefined threshold, then control proceeds to block 110.

A diagnostic protocol is then initiated, as illustrated at block 110. Generally speaking, the diagnostic protocol is intended to alert an operator to the unlatched condition, discontinue vehicle motion, automatically attempt to verify the unlatched condition or re-latch the closure, or a combination thereof. As illustrated at block 112, the diagnostic protocol may include signaling an alert to an operator, e.g. by presenting an audiovisual alert to an occupant of the vehicle via an HMI or communicating an alert to a remote administrator via a wireless communication interface.

The diagnostic protocol may also include automatically performing an unlatch verification and/or re-latch maneuver, as will be discussed in further detail below with respect to FIGS. 4 and 5.

In embodiments including an automated driving system capable of autonomously controlling the vehicle, the diagnostic protocol may include commanding the automated driving system to perform an automated maneuver to achieve a minimal risk condition. The minimal risk condition refers to a condition in which a human user or ADS may bring a vehicle in order to reduce a risk of collision when a given trip cannot or should not be completed. This maneuver, which may be referred to as a minimal risk condition maneuver, may vary depending on current vehicle location and traffic conditions. The minimal risk condition maneuver may include decelerating the vehicle and/or bringing the vehicle 12 to a full stop. The minimal risk condition maneuver may entail automatically bringing the vehicle to a slow or stop within a current travel path, or it may entail a more extensive maneuver designed to remove the vehicle from an active lane of traffic, e.g. by pulling the vehicle over to a shoulder. Various other maneuvers may be performed as part of a minimal risk condition maneuver.

The diagnostic protocol may also include other appropriate diagnostic or corrective maneuvers, or a combination of the above, as will be appreciated by one skilled in the art.

Figure 4:
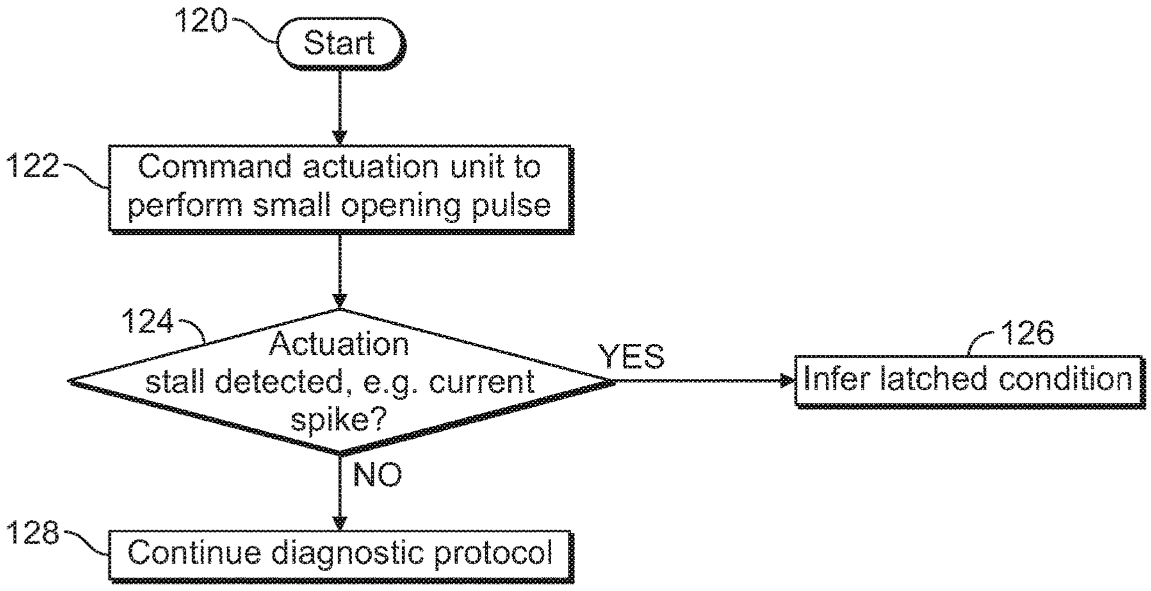
FIG. 4 is a flowchart illustrating a second method for controlling a vehicle according to the present disclosure.

Referring now to FIG. 4, a method of automatically verifying an unlatched condition of the closure is illustrated in flowchart form. The algorithm starts at block 120 and may be initiated, for example, as part of a diagnostic protocol as discussed above with respect to block 110.

An actuation unit is commanded to perform a small opening pulse, as illustrated at block 122. In an exemplary embodiment, the pulse corresponds to approximately 6 mm of closure movement. This pulse is based on typical range of closure motion between primary and secondary latch mechanisms.

A determination is made of whether an actuation unit stall is detected, as illustrated at operation 124. A stall refers to a condition where the actuation unit is unable to move the closure as intended, and may be detected by, for example, a spike in current draw of the actuation unit.

If the determination of operation 124 is positive, i.e. a stall is detected, then it may be inferred that the closure is latched properly, as illustrated at block 126. In an exemplary embodiment, control then returns to the algorithm illustrated in FIG. 3.

If the determination of operation 124 is negative, i.e. no stall is detected, then it may be inferred that the closure is not latched properly, and the diagnostic protocol may be continued, as illustrated at block 128. Continuing the diagnostic protocol may include, for example, performing any of the other actions discussed above with respect to block 112 in FIG. 3.

Figure 5:
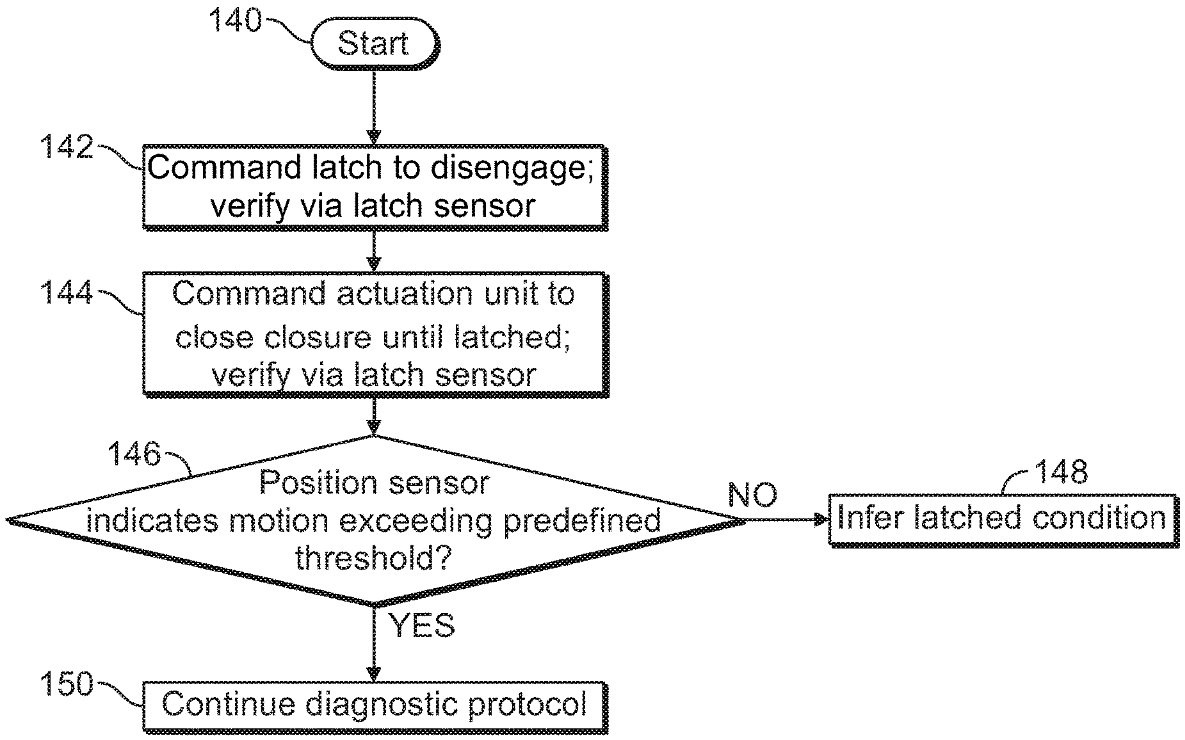
FIG. 5 is a flowchart illustrating a third method for controlling a vehicle according to the present disclosure.

Referring now to FIG. 5, a method of automatically attempting to relatch a closure is illustrated in flowchart form. The algorithm starts at block 140 and may be initiated, for example, as part of a diagnostic protocol as discussed above with respect to block 110.

The latch is commanded to disengage and the latch sensor is monitored to verify an unlatched status, as illustrated at block 142. Subsequently, the actuation unit is commanded to close the closure, and the latch sensor is monitored to verify a latched status, as illustrated at block 144. This may be performed, for example, by a controller configured as the controller 18 illustrated in FIG. 1, based on signals from the latch sensor 28.

A determination is made of whether a position sensor signal indicates closure motion exceeding a predefined threshold, as illustrated at operation 146. This may be performed generally similar to the operation 108 illustrated in FIG. 3.

If the determination of operation 146 is negative, i.e. detected motion, if any, does not exceed the predefined threshold, then it may be inferred that the closure is latched properly, as illustrated at block 148. In an exemplary embodiment, control then returns to the algorithm illustrated in FIG. 3.

If the determination of operation 146 is positive, the signal does indicate closure motion exceeding the predefined threshold, then it may be inferred that the closure is not latched properly, and the diagnostic protocol may be continued, as illustrated at block 150. Continuing the diagnostic protocol may include, for example, performing any of the other actions discussed above with respect to block 112 in FIG. 3.

As may be seen, the present disclosure provides a system and method for automatically detecting when a closure is not correctly latched and for performing appropriate diagnostic actions when such conditions arise, thereby improving user satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:

a closure frame defining an opening to the vehicle;

a closure arranged relative the closure frame to selectively cover the opening, the closure having a plurality of positions including a closed position and an open position;

an actuator configured to move the closure among the plurality of positions;

a first sensor configured to detect motion of the closure among the plurality of positions;

a latch assembly including a first component associated with the closure and a second component associated with the closure frame, the first component and second component being couplable in an engaged state to retain the closure in the closed position and decouplable in a disengaged state to permit the closure to move among the plurality of positions;

a second sensor configured to detect the engaged or disengaged state of the latch assembly; and at least one controller configured to, in response to the first sensor detecting motion of the closure among the plurality of positions and the second sensor detecting the latch assembly in the engaged state, provide a diagnostic signal;

wherein the latch assembly includes a primary latch and a secondary latch, and wherein the second sensor includes a first switch associated with the primary latch and a second switch associated with the secondary latch.

2. The vehicle of claim 1, wherein the first sensor includes a Hall effect encoder associated with the actuator.

3. The vehicle of claim 1, wherein the controller is further configured to, in response to the first sensor detecting motion of the closure among the plurality of positions and the second sensor detecting the latch assembly in the engaged state, command the actuator to move the closure a predefined distance toward the open position, detect an actuator stall condition, and to provide the diagnostic signal in further response to detecting the actuator stall condition.

4. The vehicle of claim 1, further comprising a latch actuator configured to selectively decouple the latch assembly, wherein the controller is further configured to, in response to the first sensor detecting motion of the closure among the plurality of positions and the second sensor detecting the latch assembly in the engaged state, command the latch actuator to decouple the latch assembly, command the actuator to move the closure a predefined distance toward the closed position, and to provide the diagnostic signal in further response to the first sensor detecting motion of the closure among the plurality of positions and the second sensor detecting the latch assembly in the engaged state subsequent the command to the actuator to move the closure a predefined distance.

5. The vehicle of claim 1, further comprising a human-machine interface, wherein the diagnostic signal includes an audio notification, visual notification, or haptic notification via the human-machine interface.

6. The vehicle of claim 1, further comprising a wireless communication interface, wherein the diagnostic signal includes an alert to a remote operator via the wireless communication interface.

7. An automotive vehicle comprising:

a closure frame defining an opening to the vehicle;

a closure arranged relative the closure frame to selectively cover the opening, the closure having a plurality of positions including a closed position and an open position;

an actuator configured to move the closure among the plurality of positions;

a first sensor configured to detect motion of the closure among the plurality of positions;

a latch assembly including a first component associated with the closure and a second component associated with the closure frame, the first component and second component being couplable in an engaged state to retain the closure in the closed position and decouplable in a disengaged state to permit the closure to move among the plurality of positions;

a second sensor configured to detect the engaged or disengaged state of the latch assembly; and at least one controller configured to, in response to the first sensor detecting motion of the closure among the plurality of positions and the second sensor detecting the latch assembly in the engaged state, provide a diagnostic signal;

wherein the controller is further configured to, in response to the first sensor detecting motion of the closure among the plurality of positions and the second sensor detecting the latch assembly in the engaged state, command the actuator to move the closure a predefined distance toward the open position, detect an actuator stall condition, and to provide the diagnostic signal in further response to detecting the actuator stall condition.

8. An automotive vehicle comprising:

a closure frame defining an opening to the vehicle;

a closure arranged relative the closure frame to selectively cover the opening, the closure having a plurality of positions including a closed position and an open position;

an actuator configured to move the closure among the plurality of positions;

a first sensor configured to detect motion of the closure among the plurality of positions;

a latch assembly including a first component associated with the closure and a second component associated with the closure frame, the first component and second component being couplable in an engaged state to retain the closure in the closed position and decouplable in a disengaged state to permit the closure to move among the plurality of positions;

a second sensor configured to detect the engaged or disengaged state of the latch assembly;

at least one controller configured to, in response to the first sensor detecting motion of the closure among the plurality of positions and the second sensor detecting the latch assembly in the engaged state, provide a diagnostic signal; and a latch actuator configured to selectively decouple the latch assembly, wherein the controller is further configured to, in response to the first sensor detecting motion of the closure among the plurality of positions and the second sensor detecting the latch assembly in the engaged state, command the latch actuator to decouple the latch assembly, command the actuator to move the closure a predefined distance toward the closed position, and to provide the diagnostic signal in further response to the first sensor detecting motion of the closure among the plurality of positions and the second sensor detecting the latch assembly in the engaged state subsequent the command to the actuator to move the closure a predefined distance.

* * * * *